US009146744B2

(12) United States Patent
Caprioli et al.

(10) Patent No.: US 9,146,744 B2
(45) Date of Patent: Sep. 29, 2015

(54) STORE QUEUE HAVING RESTRICTED AND UNRESTRICTED ENTRIES

(75) Inventors: Paul Caprioli, Santa Clara, CA (US); Martin Karlsson, San Francisco, CA (US); Shailender Chaudhry, San Francisco, CA (US); Gideon N. Levinsky, Austin, TX (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 1644 days.

(21) Appl. No.: 12/116,009

(22) Filed: May 6, 2008

(65) Prior Publication Data

US 2009/0282225 A1    Nov. 12, 2009

(51) Int. Cl.
*G06F 15/00* (2006.01)
*G06F 7/38* (2006.01)
*G06F 9/00* (2006.01)
*G06F 9/44* (2006.01)
*G06F 9/38* (2006.01)

(52) U.S. Cl.
CPC .............. *G06F 9/3826* (2013.01); *G06F 9/383* (2013.01); *G06F 9/3842* (2013.01); *G06F 9/3855* (2013.01)

(58) Field of Classification Search
USPC ......................................................... 712/225
See application file for complete search history.

(56) References Cited

U.S. PATENT DOCUMENTS

2005/0120179 A1 *  6/2005  Akkary et al. ................. 711/126

OTHER PUBLICATIONS

Akkary et al; Checkpoint Processing and Recovery: Towards Scalable Large Instruction Window Processors; 2003; IEEE.*
Liu; Scaling Load-Store Queue; Dec. 2006.*
Gandhi et al.; Scalable Load and Store Processing in Latency Tolerant Processors; 2005; IEEE.*
Sethumadhavan et al.; Scalable Hardware Memory Disambiguation for High ILP Processors; 2003; IEEE.*

* cited by examiner

*Primary Examiner* — Corey S Faherty
(74) *Attorney, Agent, or Firm* — Park, Vaughan, Fleming & Dowler LLP; Anthony P. Jones

(57) ABSTRACT

Embodiments of the present invention provide a system which executes a load instruction or a store instruction. During operation the system receives a load instruction. The system then determines if an unrestricted entry or a restricted entry in a store queue contains data that satisfies the load instruction. If not, the system retrieves data for the load instruction from a cache. If so, the system conditionally forwards data from the unrestricted entry or the restricted entry by: (1) forwarding data from an unrestricted entry that contains the youngest store that satisfies the load instruction when any number of unrestricted or restricted entries contain data that satisfies the load instruction; (2) forwarding data from an unrestricted entry when only one restricted entry and no unrestricted entries contain data that satisfies the load instruction; and (3) deferring the load instruction by placing the load instruction in a deferred queue when two or more restricted entries and no unrestricted entries contain data that satisfies the load instruction.

18 Claims, 4 Drawing Sheets

STORE QUEUE HAVING RESTRICTED AND UNRESTRICTED ENTRIES

BACKGROUND

1. Field of the Invention

Embodiments of the present invention relate a store queue. More specifically, embodiments of the present invention relate to a store queue that provides efficient data forwarding and store merging.

2. Related Art

Most modern processors contain store queues to prevent the processor from experiencing delays associated with committing stores to the next level of the memory hierarchy. Generally, when a store is executed by a processor the store is buffered in a store queue, making it appear that the store has been completed. However, the store may be held in the store queue until updates to the next level of the memory hierarchy have finished.

Because a store can be held in the store queue for an extended period of time, processors typically forward data from buffered stores to subsequent dependent loads. In order to determine if data should be forwarded to a subsequent load, processors compare the addresses of subsequent loads to the address for each entry in the store queue. This process typically involves using a content addressable memory (CAM) circuit to perform the comparison. Unfortunately, CAM circuits require considerable semiconductor area, consume significant power, and complicate the processor's design. Moreover, because the size of the CAM circuit scales with the number of entries in the store queue, the designers have been forced to limit the number of entries in store queue.

In addition, when forwarding data for a load that matches multiple entries in the store queue, the processor is required to determine which entry is the youngest entry. Hence, processors typically include an "age" value with each entry in the store queue. When determining if data should be forwarded from the store queue, the processor compares the ages of each matching entry. This age comparison is on the critical path of a forwarding operation, which further limits the number of entries that can be used in a store queue.

Hence, what is needed is a store queue without the above-described problems.

SUMMARY

Embodiments of the present invention provide a system which includes a processor with a store queue that handles data on a processor. During operation, the system receives a load instruction. The system then determines if an unrestricted entry or a restricted entry in a store queue contains data that satisfies the load instruction. If not, the system retrieves data for the load instruction from a cache. If so, the system conditionally forwards data from the unrestricted entry or the restricted entry by: (1) forwarding data from the unrestricted entry that contains the youngest store that satisfies the load instruction when any number of unrestricted or restricted entries contain data that satisfies the load instruction; (2) forwarding data from the restricted entry when only one restricted entry and no unrestricted entries contain data that satisfies the load instruction; and (3) deferring the load instruction by placing the load instruction in a deferred queue when two or more restricted entries and no unrestricted entries contain data that satisfies the load instruction.

In some embodiments, when determining if an unrestricted entry contains data that satisfies the load instruction, the system: (1) determines if any unrestricted entry in a set of unrestricted entries in the store queue contains a buffered store to a same cache line as the load; (2) for each such unrestricted entry, determines if an age of the unrestricted entry matches a global age counter; and (3) if the age of an unrestricted entry matches the global age counter, uses a bitmask for the unrestricted entry to determine if each byte needed to satisfy the load instruction is contained in the unrestricted entry. In these embodiments, an unrestricted entry satisfies the load instruction when the buffered store is directed to the same cache line, the bitmask indicates that each byte needed to satisfy the load instruction is contained in the entry, and the age of the entry and the global age counter match.

In some embodiments, when determining if a restricted entry contains data that satisfies the load instruction, the system: (1) determines if any one restricted entry in the store queue contains a store directed to the same cache line as the load; and (2) for the restricted entry, uses a bitmask for the restricted entry to determine if each byte for the load instruction is contained in the restricted entry. In these embodiments, a restricted entry satisfies the load instruction when the buffered store is directed to the same cache line and the bitmask indicates that each byte needed to satisfy the load instruction is contained in the entry.

In some embodiments, the system re-executes the deferred load when no more than one of the restricted entries contain data that will satisfy the load instruction.

In some embodiments, the system receives a new store to a cache line. The system then determines if one or more unrestricted entries in the store queue contain buffered stores that are directed to a same cache line. If not, the system buffers the new store in a next entry in the store queue. If so, the system determines an age of the one or more unrestricted entries. If an age of an unrestricted entry matches a global age counter, the system merges the new store into the unrestricted entry, otherwise, the system buffers the new store in the next entry in the store queue.

In some embodiments, when forwarding data, the system copies the data from an entry in the store queue to a processor register so that the processor register can be used in subsequent computational operations.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Computer System

Figure 1A:
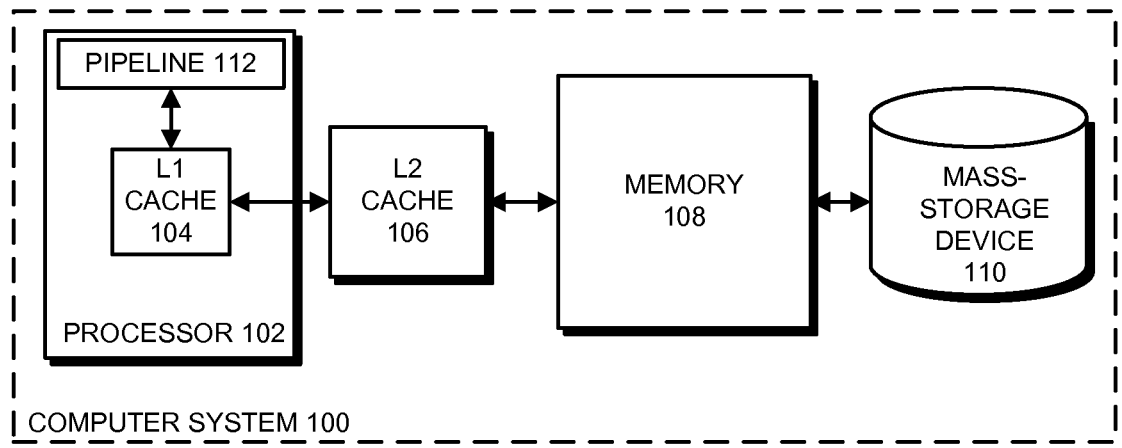
FIG. 1A presents a block diagram of a computer system in accordance with embodiments of the present invention.

FIG. 1A presents a block diagram of a computer system 100 in accordance with embodiments of the present invention. Computer system 100 includes processor 102, L2 cache 106, memory 108, and mass-storage device 110. Processor 102 includes L1 cache 104 and pipeline 112.

Processor 102 can be a general-purpose processor that performs computational operations. For example, processor 102 can be a central processing unit (CPU) such as a microprocessor. Note that processor 102 can also be a controller or an application-specific integrated circuit.

Mass-storage device 110, memory 108, L2 cache 106, and L1 cache 104 are computer-readable storage media that collectively form a memory hierarchy that stores data and instructions for processor 102. Generally, mass-storage device 110 is a high-capacity non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments of the present invention, L2 cache 106, memory 108, and mass-storage device 110 are shared between one or more processors in computer system 100. Such memory structures are well-known in the art and are therefore not described in more detail.

Computer system 100 can be incorporated into many different types of electronic devices. For example, computer system 100 can be part of a desktop computer, a laptop computer, a server, a media player, an appliance, a cellular phone, a piece of testing equipment, a network appliance, a calculator, a personal digital assistant (PDA), a hybrid device (i.e., a "smart phone"), a guidance system, a control system (e.g., an automotive control system), or another electronic device.

Although we use specific components to describe computer system 100, in alternative embodiments different components can be present in computer system 100. For example, computer system 100 can include video cards, network cards, optical drives, and/or other peripheral devices that are coupled to processor 102 using a bus, a network, or another suitable communication channel. Alternatively, computer system 100 may include one or more additional processors, wherein the processors share some or all of L2 cache 106, memory 108, and mass-storage device 110.

Figure 1B:
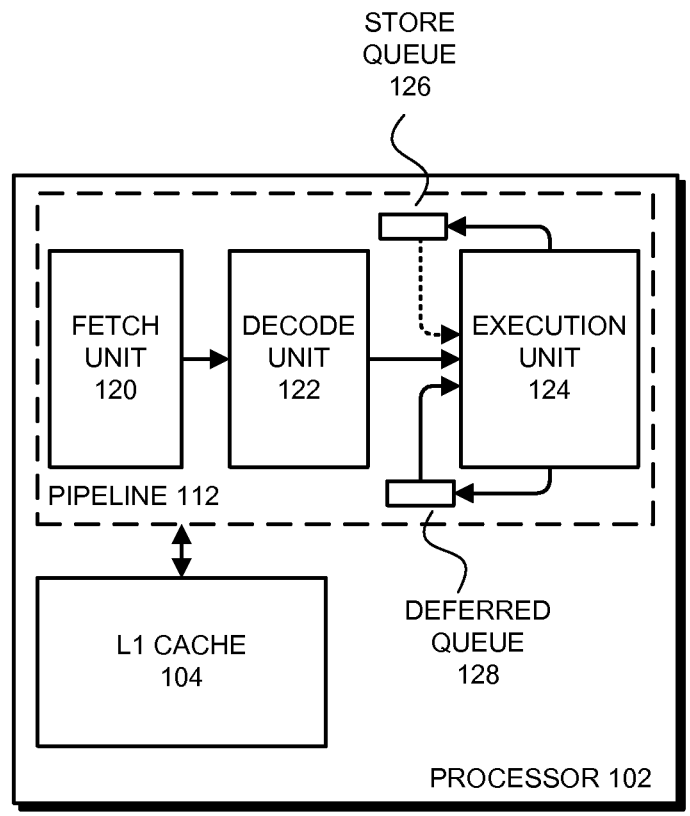
FIG. 1B presents a block diagram of processor in accordance with embodiments of the present invention.

FIG. 1B presents a block diagram of processor 102 in accordance with embodiments of the present invention. As shown in FIG. 1B, pipeline 112 includes fetch unit 120, decode unit 122, and execution unit 124. Pipeline 112 is used to execute instructions from program code.

Within pipeline 112, fetch unit 120 fetches instructions from L1 cache 104 (or from higher levels of the memory hierarchy) for execution in processor 102. Decode unit 122 decodes the fetched instructions and prepares the instructions for execution in execution unit 124. Execution unit 124 executes instructions forwarded from decode unit 122. Execution unit 124 can include one or more floating point execution units, integer execution units, branch execution units, and/or memory execution units (e.g., load-store units).

In embodiments of the present invention, pipeline 112 includes deferred queue 128. Pipeline 112 uses deferred queue 128 to store instructions with unresolved dependencies until the unresolved dependencies are resolved. When the unresolved dependencies are resolved, processor 102 executes the instructions. While the instructions with unresolved data dependencies are held in the deferred queue, processor 102 can speculatively execute subsequent non-dependent instructions. Speculative execution is described in more detail below.

In embodiments of the present invention, pipeline 112 includes store queue 126, which is an N-entry queue used by processor 102 to buffer stores. Generally, a store is executed by processor 102 and then buffered in store queue 126, making it appear to processor 102 that the store has been completed. However, the store may be held in store queue 126 until pending updates to the next level of the memory hierarchy have finished.

While a given store is buffered in store queue 126, the data from the buffered store can be "forwarded" to subsequent load instructions. When forwarding data, processor 102 copies the data from an entry in store queue 126 to a register for subsequent use by execution unit 124. Note that data forwarding in embodiments of the present invention is described in more detail below.

In addition, subsequent stores can be merged with already-buffered stores in store queue 126 by coalescing subsequently buffered stores into existing entries that contain stores directed to the same cache line address. For example, because processor 102 supports stores ranging in size from a single byte to a doubleword, merging stores can involve coalescing single bytes into an entry in the store queue that already contains one or more bytes of a buffered store. This merging of stores is described in more detail below.

In embodiments of the present invention, the entries in store queue 126 are classified as "unrestricted entries" or "restricted entries." An unrestricted entry is available for unrestricted store merging and data forwarding. In contrast, a restricted entry is available for limited data forwarding, but is not available for store merging.

In some embodiments of the present invention, unrestricted entries make up a small portion of the entries in store queue 126, while the remaining entries are restricted entries. For example, assuming that store queue 126 includes eight entries, two of the entries can be unrestricted entries, while the remaining entries are restricted. Alternatively, assuming that store queue 126 includes 64 entries, four of the entries can be unrestricted entries, while the remaining entries are restricted.

Unrestricted entries require additional circuitry in store queue 126 for supporting unrestricted data forwarding and store merging. Hence, by dividing store queue 126 into a smaller number of unrestricted entries and a large number of restricted entries, embodiments of the present invention provide the benefit of data forwarding and store merging for a limited number of entries while avoiding the timing overhead, area and power consumption, and circuit complexity of existing store queue implementations that support data forwarding and store merging from all entries.

Note that pipeline 112 is an exemplary pipeline for the purposes of illustration. In alternative embodiments, pipeline 112 contains other stages (units) and/or circuits. The stages and/or circuits that can be used in a pipeline are known in the art and hence are not described in more detail.

Store Queue

Figure 2:
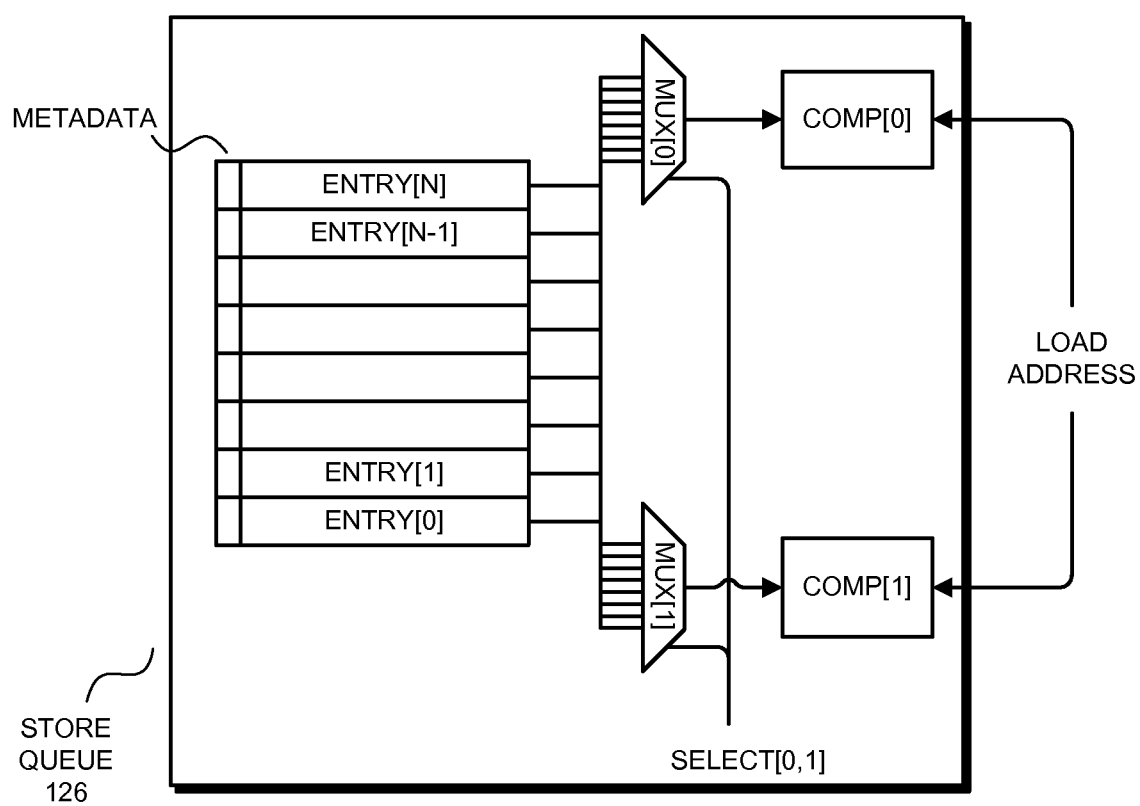
FIG. 2 presents a block diagram of a store queue in accordance with embodiments of the present invention.

FIG. 2 presents a block diagram of a store queue 126 in accordance with embodiments of the present invention. Store queue 126 includes N entries, entry[0]-entry[N], two multiplexers, mux[0] and mux[1], and two comparators, comp[0] and comp[1].

Entries[0-N] are used for storing the data from buffered stores until the stores can be completed to L1 cache 104. Because processor 102 supports stores ranging in size from a single byte to a doubleword, in some embodiments of the present invention, each entry is a doubleword in length.

As described above, the entries in store queue 126 are divided into restricted entries and unrestricted entries. In some embodiments of the present invention, the unrestricted entries are indicated using select indicators (select[0] and select[1]). In these embodiments, store queue 126 can use each select indicator to access the metadata in a corresponding entry, as well as control which entries are used for data forwarding and store merging. In some embodiments of the present invention, each select indicator (e.g., select[0]) contains the address for the entry in store queue 126 where the unrestricted entry is located.

When buffering a new store, store queue 126 buffers the new store into an available restricted or unrestricted entry. If the store is buffered to a restricted entry, store queue 126 then updates the corresponding select indicator from the oldest unrestricted entry to the new entry. Upon updating the select indicator, the oldest unrestricted entry becomes a restricted entry, while the new entry becomes an unrestricted entry. (In some embodiments of the present invention, if there is no restricted entry available, store queue 126 does not buffer the store, instead processor 102 defers the store and re-executes the store when space becomes available in store queue 126.)

In embodiments of the present invention, when comparing unrestricted entries to the load (i.e., not restricted entries), the addresses of the unrestricted entries, the age values, and the bitmasks are forwarded from the entries to comp[0-1] via mux[0-1] (age values and bitmasks are described in more detail below). Comp[0-1] then performs the comparison operations. Select[0-1] determines which entries this information is forwarded from for the comparison.

Each entry in store queue 126 includes metadata that contains a bitmask and an age value. The bitmask indicates which bytes in the entry presently contain data from a buffered store. During operation, when data is read from an entry in store queue 126, the bitmask can also be read to determine which bytes in the entry are valid (i.e., have had data buffered in them).

Because processor 102 has a limited number of clock cycles for acquiring forwarded data from store queue 126, in some embodiments of the present invention there is insufficient time to: (1) determine if store queue 126 has a match; (2) determine if the bitmask indicates that the buffered store can satisfy the load; and (3) read the appropriate data from store queue 126 to a processor register. Hence, in these embodiments, processor 102 determines if store queue 126 contains a qualifying entry that matches with the load address (as described in more detail below) and immediately loads the buffered data from a matching entry. In parallel with loading the data, processor 102 compares the bitmask in the matching entry with the load to determine if the data in the entry can satisfy the load. If so, the data from the entry is used to satisfy the load. Otherwise, data from another source is used to satisfy the load (e.g., from L1 cache 104). In order to have data from another source ready for this case, these embodiments can load the data from the other source (from L1 cache 104 or L2 cache 106, etc.) in parallel with the attempt to load the data from store queue 126.

The age value for each entry is a numerical value that represents the age of the entry. The age value is used by processor 102 to track the age of buffered stores in unrestricted entries to: (1) prevent merging stores into an existing unrestricted entry in store queue 126 when an intervening unsatisfied load has been deferred; and (2) prevent younger stores from among multiple buffered stores to the same cache line (in the unrestricted entries) from being inadvertently used to satisfy subsequent loads. In some embodiments, the age value is used to track the age of an entire entry. In alternative embodiments, an age value can be maintained for individual bytes in the entry (i.e., several age values can be maintained for each entry).

During operation, processor 102 increments a global age counter when deferring the first load following a store operation to the same address. Before a store is buffered in store queue 126, processor determines if one or more unrestricted entries contain a buffered store that is directed to the same address. If so, processor 102 determines if the global age counter and the age in the metadata for any of the determined entries match (meaning that no deferred loads of the same address have occurred since the last store was buffered to the entry). If so, processor 102 can merge the current store with the determined entry. Otherwise, processor 102 buffers the store to a new unrestricted entry.

Although not shown in FIG. 2, in embodiments of the present invention store queue 126 includes additional mechanisms for handling stores. For example, store queue 126 can include mechanisms for writing stores from execution unit 124 to entries 0-N, mechanisms for reading one or more of entries 0-N for use in forwarding the data from buffered stores to subsequent dependent instructions.

Note that in embodiments of the present invention, all of the addresses for stores buffered in restricted entries in store queue 126 are compared to each load address. In these embodiments, the comparison is used to determine if there are one or more matches among the restricted entries, because data can be forwarded from among the restricted entries, but only when exactly one restricted entry can satisfy the load. More specifically, because an age comparison is never done for restricted entries, data can be forwarded from a restricted entry if exactly one restricted entry (and no unrestricted entries) can satisfy the load. If there are several restricted entries (and no unrestricted entries) that can satisfy the load, these embodiments defer the load. Because the buffered stores in the unrestricted entries are guaranteed to be younger than the buffered stores in the restricted entries, any time that there is an unrestricted entry that can be used to satisfy the load, these embodiments use the unrestricted entry.

Speculative Execution

Embodiments of the present invention support speculative execution. Generally, these embodiments start by executing instructions in program order in a normal-execution mode. Then, when processor 102 (see FIG. 1) encounters a stall condition, these embodiments can enter a speculative execution mode to continue to perform useful computational work until the stall condition is resolved. For example, some embodiments of the present invention support execute-ahead mode, wherein instructions with unresolved data dependencies are deferred, while other non-dependent instructions are executed in program order.

During execute-ahead mode, processor 102 defers an instruction with an unresolved data dependency by placing the instruction into a deferred queue 128, then executes subsequent non-dependent instructions. While executing the subsequent instructions, processor 102 can defer instructions with unresolved data dependencies by placing these instructions into deferred queue 128 in program order. When data ultimately returns for a deferred instruction, processor 102 can make one or more passes through deferred queue 128 to execute deferred instructions that depend on the returned data. While executing these instructions, processor 102 can re-defer instructions with unresolved data dependencies by placing these instructions back into deferred queue 128 in program order. If all the deferred instructions in deferred queue 128 are executed (i.e., when deferred queue 128 is empty), processor 102 can resume execution in normal-execution mode. Otherwise, processor 102 can resume execution in execute-ahead mode until a subsequent data return.

In these embodiments, upon determining that two or more restricted entries in store queue 126 contain a buffered store that can satisfy a load, embodiments of the present invention defer the load by placing the load in deferred queue 128 and enter a speculative execution mode until the stores have cleared from store queue 126 (i.e., until the two or more stores in the restricted entries that are directed at the cache line have cleared). When the stores have cleared from store queue 126, processor 102 can make a pass through deferred queue 128 to re-execute the deferred load instruction.

Note that if one or more unrestricted entries can satisfy the load, regardless of the number of restricted entries that can satisfy the load, the load is not deferred. Instead, data for the load is forwarded from the unrestricted entry (because the unrestricted entries are guaranteed to be younger than the restricted entries).

Forwarding Data

Figure 3:
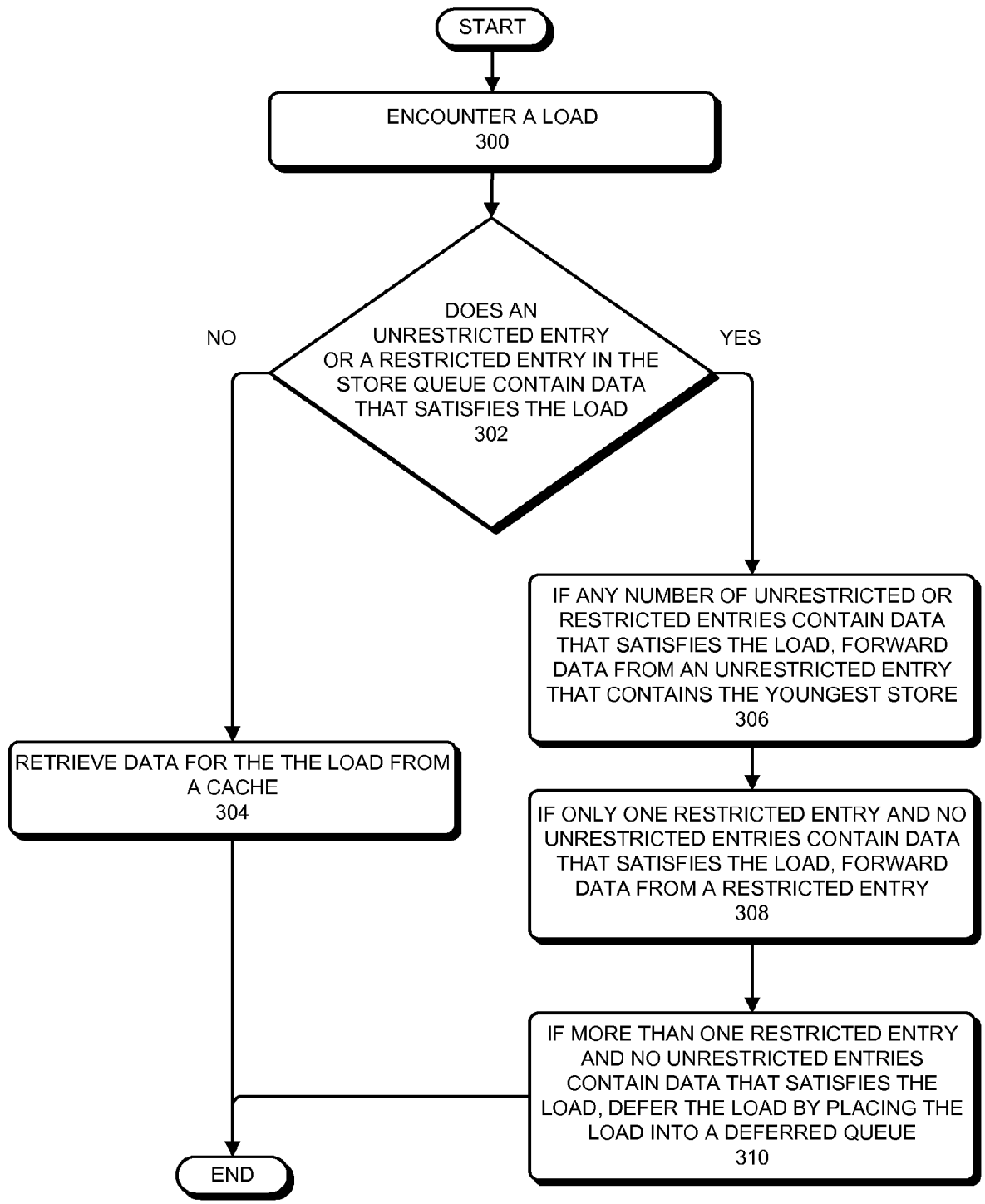
FIG. 3 presents a flowchart illustrating a process for forwarding data in accordance with embodiments of the present invention.

FIG. 3 presents a flowchart illustrating a process for forwarding data in accordance with embodiments of the present invention. The process starts when processor 102 encounters a load (step 300). Processor 102 then forwards the address of the load to store queue 126 so that store queue 126 can determine if data can be forwarded to the load from a buffered store (i.e., data from an entry in store queue 126 can be used to satisfy the load).

Note that although we describe embodiments of the present invention where processor 102 and store queue 126 perform the operations for the data forwarding process, in alternative embodiments some or all of the operations are performed by other structures within computer system 100.

Store queue 126 then determines if any unrestricted or restricted entries in store queue 126 contain data that satisfies the load (step 302). When making this determination, store queue 126 determines if any restricted or unrestricted entry in store queue 126 contains a buffered store that is directed to the same cache line as the load. More specifically, store queue 126 compares the address of the load to the address for the buffered store in each entry in store queue 126 (i.e., the address to which the buffered store in the entry is directed) to determine if there is a match between the addresses. Store queue 126 also determines if the bitmask for the entry indicates that the bytes within the entry contain the data that is being loaded. If both are true for a given restricted or unrestricted entry, the load can be satisfied from the entry.

If no entry in store queue 126 can be used to satisfy the load, processor 102 retrieves the data for the load from a cache (step 304). For example, processor 102 can retrieve the data from L1 cache 104. In some embodiments of the present invention, processor 102 loads the cache line from the cache (e.g., L1 cache 104) in parallel with doing the comparison in store queue 126. In these embodiments, if there is no entry in store queue 126 that can satisfy the load, processor 102 is prepared to immediately use the cache line loaded from the cache.

If any number of unrestricted or restricted entries contain data that satisfies the load, store queue 126 forwards the data from the unrestricted entry that contains the youngest store (step 306). In other words, the unrestricted entry that contains the most recently buffered store is used to satisfy the load regardless to the number of restricted entries that may be available. In these embodiments, the restricted entries are not used because the stores contained in the unrestricted entries are guaranteed to be more recently buffered than the store in any restricted entry.

When more than one unrestricted entry contains a buffered store that satisfies the load, store queue 126 compares the age value in the metadata for each of the unrestricted entries to determine which store is the youngest. The entry with the lowest age value contains the youngest store. (The age value is never compared for restricted entries.) In some embodiments, store queue 126 also compares the age value to a global age counter to determine if the age value for the youngest store (in the unrestricted entry) is the same as the global age counter. If the values differ, one or more dependent loads have been deferred since the store was written to the entry in store queue 126 and processor 102 does not use the data contained in the entry to satisfy the load. Processor 102 instead defers the load by placing the load in the deferred queue.

If only one restricted entry and no unrestricted entries contain data that satisfies the load, store queue 126 forwards the data from a restricted entry (step 308). (Note that in some embodiments of the present invention this is the only case when data is forwarded from a restricted entry in store queue 126.)

If more than one restricted entry and no unrestricted entries contain data that satisfies the load, processor 102 defers the load by placing the load into deferred queue 128 (step 310). As described above, placing the load in the deferred queue delays the execution of the load until one or more of the stores to the cache line have been committed from store queue 126.

Store Merging

Figure 4:
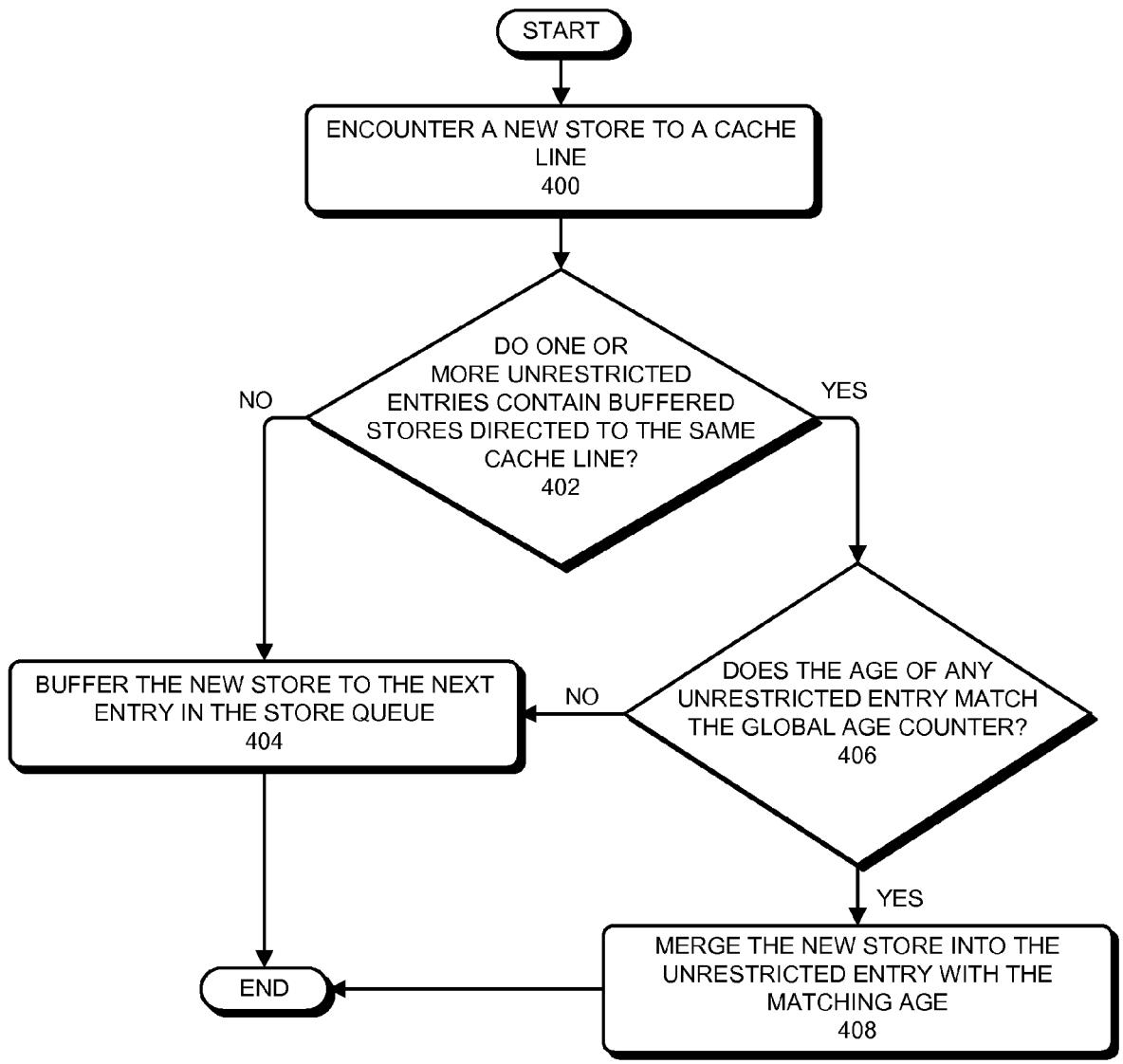
FIG. 4 presents a flowchart illustrating a process of store merging in accordance with embodiments of the present invention.

FIG. 4 presents a flowchart illustrating a process of store merging in accordance with embodiments of the present invention. The process starts when processor 102 encounters a new store to a cache line (step 400). Processor 102 forwards the new store to store queue 126 to buffer the store.

Store queue 126 then determines if one or more unrestricted entries contain buffered stores directed to the same cache line (step 402). When making this determination, store queue 126 compares the address of the store to the addresses to which the buffered store in any unrestricted entry is directed.

Recall that store merging is not enabled for restricted cache lines. Hence, store queue 126 does not compare the addresses of restricted cache lines with the address for the new store. Because store queue 126 does not compare these addresses, store queue 126 need not include some of the comparison circuitry which is present in store queues in existing systems that support store merging for all entries.

If none of the unrestricted entries contain a buffered store directed to the same cache line, store queue 126 buffers the store in a next entry in store queue 126 (step 404). Buffering the store in the next entry in store queue 126 involves buffering the store in an available restricted or unrestricted entry. Some embodiments of the present invention preferentially buffer the store in an unrestricted entry (which is only available when no unrestricted entries are have been used). However, upon buffering the store in a restricted entry, store queue 126 updates a select indicator to indicate the restricted entry. Updating the select indicator causes the restricted entry to become unrestricted and the previously unrestricted entry to become restricted. In this way, store queue 126 retains a record of the most-recently buffered stores.

If one or more of the unrestricted entries contain a buffered store directed to the same cache line, store queue 126 determines if the age value of any unrestricted entry matches the global age counter (step 406). If so, no deferred loads have occurred since the last store operation and the new store operation is merged into the unrestricted entry with the matching age (step 408). Otherwise, store queue 126 buffers the store in a next entry in store queue 126 (step 404).

Note that if store queue 126 is full (i.e., no unrestricted or restricted entries are available for buffering the store), some embodiments of the present invention defer the store by placing the store in deferred queue 128.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for processing a load instruction, comprising:
   receiving the load instruction;
   determining if an entry in a store queue contains data that satisfies the load instruction;
   if no entry in the store queue contains data that satisfies the load instruction, retrieving data for the load instruction from a cache; and
   if an entry in the store queue contains data that satisfies the load instruction, conditionally forwarding data from entry by:
      forwarding data from an unrestricted entry that contains the youngest store that satisfies the load instruction when any number of unrestricted or restricted entries contain data that satisfies the load instruction;
      forwarding data from an unrestricted entry when only one restricted entry and no unrestricted entries contain data that satisfies the load instruction; and
      deferring the load instruction by placing the load instruction in a deferred queue when two or more restricted entries and no unrestricted entries contain data that satisfies the load instruction.

2. The method of claim 1, wherein determining if an unrestricted entry contains data that satisfies the load instruction involves:
   determining if any unrestricted entry in a set of unrestricted entries in the store queue contains a buffered store to a same cache line as the load;
   for each such unrestricted entry, determining if an age of the unrestricted entry matches a global age counter; and
   if the age of an unrestricted entry matches the global age counter, using a bitmask for the unrestricted entry to determine if each byte needed to satisfy the load instruction is contained in the unrestricted entry;
   wherein an unrestricted entry satisfies the load instruction when the buffered store is directed to the same cache line, the bitmask indicates that each byte needed to satisfy the load instruction is contained in the entry, and the age of the entry and the global age counter match.

3. The method of claim 1, wherein determining if a restricted entry contains data that satisfies the load instruction involves:
   determining if any one restricted entry in the store queue contains a store directed to the same cache line as the load; and
   for the restricted entry, using a bitmask for the restricted entry to determine if each byte for the load instruction is contained in the restricted entry;
   wherein a restricted entry satisfies the load instruction when the buffered store is directed to the same cache line and the bitmask indicates that each byte needed to satisfy the load instruction is contained in the entry.

4. The method of claim 1, wherein the method further comprises re-executing the deferred load when no more than one of the restricted entries contain data that satisfies the load instruction.

5. The method of claim 1, further comprising:
   receiving a new store to a cache line; and
   determining if one or more unrestricted entries in the store queue contain buffered stores that are directed to a same cache line;
      if not, buffering the new store in a next entry in the store queue;
      if so, determining an age of the one or more unrestricted entries;
         if an age of an unrestricted entry matches a global age counter, merging the new store into the unrestricted entry,
         otherwise, buffering the new store in the next entry in the store queue.

6. The method of claim 1, wherein forwarding data involves copying the data from an entry in the store queue to a processor register so that the processor register can be used in subsequent computational operations.

7. An apparatus that processes a load instruction, comprising:
   a processor;
   a cache coupled to the processor, wherein the cache stores data for the processor;
   a store queue in the processor, wherein the processor is configured to buffer stores into the store queue until the stores have been committed to the cache;
   wherein the processor is configured to receive a load instruction;
   in response to receiving the load instruction, the processor is configured to determine if an entry in the store queue contains data that satisfies the load instruction;
   if no entry in the store queue contains data that satisfies the load instruction, the processor is configured to retrieve data for the load instruction from the cache; and
   if an entry in the store queue contains data that satisfies the load instruction, the processor is configured to conditionally forward data from the entry by:
      forwarding data from an unrestricted entry that contains the youngest store that satisfies the load instruction when any number of unrestricted or restricted entries contain data that satisfies the load instruction;
      forwarding data from an unrestricted entry when only one restricted entry and no unrestricted entries contain data that satisfies the load instruction; and
      deferring the load instruction by placing the load instruction in a deferred queue when two or more restricted entries and no unrestricted entries contain data that satisfies the load instruction.

8. The apparatus of claim 7, wherein when determining if an unrestricted entry contains data that satisfies the load instruction, the processor is configured to:
   determine if any unrestricted entry in a set of unrestricted entries in the store queue contains a buffered store to a same cache line as the load;
   for each such unrestricted entry, use a bitmask for the unrestricted entry to determine if each byte needed to satisfy the load instruction is contained in the unrestricted entry; and
   if each byte needed to satisfy the load instruction is contained in the unrestricted entry, determine if an age of the unrestricted entry matches a global age counter;

wherein an unrestricted entry satisfies the load instruction when the buffered store is directed to the same cache line, the bitmask indicates that each byte needed to satisfy the load instruction is contained in the entry, and the age of the entry and the global age counter match.

9. The apparatus of claim 7, wherein when determining if a restricted entry contains data that satisfies the load instruction, the processor is configured to:
determine if any one restricted entry in the store queue contains a store directed to the same cache line as the load; and
for the restricted entry, use a bitmask for the restricted entry to determine if each byte for the load instruction is contained in the restricted entry;
wherein a restricted entry satisfies the load instruction when the buffered store is directed to the same cache line and the bitmask indicates that each byte needed to satisfy the load instruction is contained in the entry.

10. The apparatus of claim 7, wherein the processor is configured to re-execute the deferred load when no more than one of the restricted entries contain data that satisfies the load instruction.

11. The apparatus of claim 7, wherein the processor is further configured to:
receive a new store to a cache line; and
determine if one or more unrestricted entries in the store queue contain buffered stores that are directed to a same cache line;
if not, the processor is configured to buffer the new store in a next entry in the store queue;
if so, the processor is configured to determine an age of the one or more unrestricted entries;
if an age of an unrestricted entry matches a global age counter, the processor is configured to merge the new store into the unrestricted entry,
otherwise, the processor is configured to buffer the new store in the next entry in the store queue.

12. The apparatus of claim 7, wherein when forwarding data, the processor is configured to copy the data from an entry in the store queue to a processor register so that the processor can use the register in subsequent computational operations.

13. A computer system, comprising:
a processor;
a cache coupled to the processor, wherein the cache is a fast-access memory that stores recently-used data for the processor;
a mass-storage device coupled to the cache, wherein the mass-storage device is a high-capacity, slow-access storage memory that stores data for the processor;
a store queue in the processor, wherein the processor is configured to buffer stores into the store queue until the stores have been committed to the cache;
wherein the processor is configured to receive a load instruction;
in response to receiving the load instruction, the processor is configured to determine if an entry in the store queue contains data that satisfies the load instruction;
if no entry in the store queue contains data that satisfies the load instruction, the processor is configured to retrieve data for the load instruction from the cache; and
if an entry in the store queue contains data that satisfies the load instruction, the processor is configured to conditionally forward data from the entry by:
forwarding data from an unrestricted entry that contains the youngest store that satisfies the load instruction when any number of unrestricted or restricted entries contain data that satisfies the load instruction;
forwarding data from an unrestricted entry when only one restricted entry and no unrestricted entries contain data that satisfies the load instruction; and
deferring the load instruction by placing the load instruction in a deferred queue when two or more restricted entries and no unrestricted entries contain data that satisfies the load instruction.

14. The computer system of claim 13, wherein when determining if an unrestricted entry contains data that satisfies the load instruction, the processor is configured to:
determine if any unrestricted entry in a set of unrestricted entries in the store queue contains a buffered store to a same cache line as the load;
for each such unrestricted entry, use a bitmask for the unrestricted entry to determine if each byte needed to satisfy the load instruction is contained in the unrestricted entry; and
if each byte needed to satisfy the load instruction is contained in the unrestricted entry, determine if an age of the unrestricted entry matches a global age counter;
wherein an unrestricted entry satisfies the load instruction when the buffered store is directed to the same cache line, the bitmask indicates that each byte needed to satisfy the load instruction is contained in the entry, and the age of the entry and the global age counter match.

15. The computer system of claim 13, wherein when determining if a restricted entry contains data that satisfies the load instruction, the processor is configured to:
determine if any one restricted entry in the store queue contains a store directed to the same cache line as the load; and
for the restricted entry, use a bitmask for the restricted entry to determine if each byte for the load instruction is contained in the restricted entry;
wherein a restricted entry satisfies the load instruction when the buffered store is directed to the same cache line and the bitmask indicates that each byte needed to satisfy the load instruction is contained in the entry.

16. The computer system of claim 13, wherein the processor is configured to re-execute the deferred load when no more than one of the restricted entries contain data that satisfies the load instruction.

17. The computer system of claim 13, wherein the processor is further configured to:
receive a new store to a cache line; and
determine if one or more unrestricted entries in the store queue contain buffered stores that are directed to a same cache line;
if not, the processor is configured to buffer the new store in a next entry in the store queue;
if so, the processor is configured to determine an age of the one or more unrestricted entries;
if an age of an unrestricted entry matches a global age counter, the processor is configured to merge the new store into the unrestricted entry,
otherwise, the processor is configured to buffer the new store in the next entry in the store queue.

18. The computer system of claim 13, wherein when forwarding data, the processor is configured to copy the data from an entry in the store queue to a processor register so that the processor can use the register in subsequent computational operations.

* * * * *